US012404588B2

(12) United States Patent
Selezneff et al.

(10) Patent No.: US 12,404,588 B2
(45) Date of Patent: Sep. 2, 2025

(54) METHOD FOR MANUFACTURING AN ABRADABLE LAYER

(71) Applicants: SAFRAN AIRCRAFT ENGINES, Paris (FR); CENTRE NATIONAL DE LA RECHERCHE SCIENTIFIQUE, Paris (FR); UNIVERSITE PAUL SABATIER—TOULOUSE III, Toulouse (FR)

(72) Inventors: Serge Georges Vladimir Selezneff, Moissy-Cramayel (FR); Philippe Charles Alain Le Biez, Moissy-Cramayel (FR); Arnaud Louis Gabriel Fregeac, Moissy-Cramayel (FR); Florence Ansart, Labege (FR); Claude Gilbert Jean-Pierre Estournes, Rieumes (FR)

(73) Assignees: SAFRAN AIRCRAFT ENGINES, Paris (FR); CENTRE NATIONAL DE LA RECHERCHE SCIENTIFIQUE, Paris (FR); UNIVERSITE PAUL SABATIER—TOULOUSE III, Toulouse (FR)

( * ) Notice: Subject to any disclaimer, the term of this patent is extended or adjusted under 35 U.S.C. 154(b) by 0 days.

(21) Appl. No.: 18/894,743

(22) Filed: Sep. 24, 2024

(65) Prior Publication Data
US 2025/0011937 A1 Jan. 9, 2025

Related U.S. Application Data

(62) Division of application No. 17/255,232, filed as application No. PCT/FR2019/051510 on Jun. 20, 2019, now Pat. No. 12,129,553.

(30) Foreign Application Priority Data

Jun. 25, 2018 (FR) ...................................... 1855682

(51) Int. Cl.
C23C 24/08 (2006.01)
C04B 41/00 (2006.01)
C04B 41/45 (2006.01)
B82Y 40/00 (2011.01)
F01D 11/12 (2006.01)

(52) U.S. Cl.
CPC ........ *C23C 24/085* (2013.01); *C04B 41/0018* (2013.01); *C04B 41/0072* (2013.01); *C04B 41/4545* (2013.01); B82Y 40/00 (2013.01); F01D 11/122 (2013.01); F05D 2230/90 (2013.01); F05D 2240/55 (2013.01); F05D 2300/2118 (2013.01)

(58) Field of Classification Search
CPC .................................................. C23C 24/085
See application file for complete search history.

(56) References Cited

U.S. PATENT DOCUMENTS

| | | | |
|---|---|---|---|
| 4,851,188 A | 7/1989 | Schaefer et al. | |
| 6,641,907 B1* | 11/2003 | Merrill | C23C 30/00 428/313.9 |
| 2004/0137259 A1 | 7/2004 | Pabla et al. | |
| 2008/0124548 A1 | 5/2008 | Sporer et al. | |
| 2012/0027572 A1 | 2/2012 | Denece et al. | |
| 2012/0177840 A1 | 7/2012 | Strock et al. | |
| 2013/0177740 A1* | 7/2013 | Merrill | B22F 5/009 427/535 |
| 2014/0263579 A1 | 9/2014 | Kulkarni | |
| 2015/0211382 A1 | 7/2015 | Podgorski et al. | |
| 2017/0259834 A1 | 9/2017 | Audemar et al. | |
| 2019/0309651 A1 | 10/2019 | Podgorski et al. | |

FOREIGN PATENT DOCUMENTS

| | | |
|---|---|---|
| CN | 101125753 A | 2/2008 |
| CN | 104507602 A | 4/2015 |
| FR | 2 996 477 A1 | 4/2014 |
| FR | 3 044 946 A1 | 6/2017 |
| FR | 3 048 629 A1 | 9/2017 |
| FR | 3 048 640 A1 | 9/2017 |
| FR | 3 060 556 A1 | 6/2018 |
| WO | WO 2010/103213 A1 | 9/2010 |
| WO | WO 2012/120235 A1 | 9/2012 |
| WO | WO 2014/053754 A1 | 4/2014 |
| WO | WO 2017/103420 | 6/2017 |

OTHER PUBLICATIONS

International Search Report as issued in International Patent Application No. PCT/FR2019/051510, dated Aug. 27, 2019.
Viazzi, C., et al., "Synthesis of Yttria Stabilized Zirconia by sol-gel route: Influence of experimental parameters and large scale production," Solid State Sciences 8, (2006), pp. 1023-1028.

(Continued)

*Primary Examiner* — Tabatha L Penny
(74) *Attorney, Agent, or Firm* — Pillsbury Winthrop Shaw Pittman LLP

(57) ABSTRACT

A process for manufacturing an abradable layer, includes compressing a powder composition including at least micrometric ceramic particles having a number-average form factor greater than or equal to 3, a mass content of said micrometric ceramic particles in the powder composition being greater than or equal to 85%, the form factor of a particle being defined as the ratio [largest dimension of the particle]/[largest cross-sectional dimension of the particle], and sintering the powder composition thus compressed to obtain the abradable layer, wherein a temperature imposed during sintering, the sintering time and the compression pressure applied are selected so as to obtain a volume porosity rate of the abradable layer greater than or equal to 20%.

13 Claims, 4 Drawing Sheets

(56) References Cited

OTHER PUBLICATIONS

Alain, "FR3044946A1", Translated by Google Translate, Jun. 16, 2017, p. 1-8 (Year: 2017).
Ferrer, "FR2996477 A 1 ", Translated by Google Translate, Apr. 11, 2014, p. 1-6 (Year: 2014).

* cited by examiner

METHOD FOR MANUFACTURING AN ABRADABLE LAYER

CROSS-REFERENCE TO RELATED APPLICATIONS

This application is a divisional of U.S. application Ser. No. 17/255,232 filed Dec. 22, 2020, which is the U.S. National Stage of PCT/FR2019/051510, filed Jun. 20, 2019, which in turn claims priority to French patent application number 1855682 filed Jun. 25, 2018. The content of these applications are incorporated herein by reference in their entireties.

FIELD

The present invention relates to a process for manufacturing an abradable layer and a substrate coated with this abradable layer.

BACKGROUND

Abradable layers are currently used in gas turbines to minimize the functional clearance, and thus leaks, between rotating and static parts. For high-pressure turbine applications, abradable seals are deposited on ring sectors attached to the casing. When turbine blades come into contact with the abradable material, the latter should wear out as a matter of priority, thus maintaining the aerodynamic performance of the engine.

However, it is also necessary to protect the substrate from high temperatures, which can reach 1600° C., and from erosion by the flow of gas at high temperature and pressure. For this purpose, a ceramic or refractory metal-based coating is typically formed by thermal spraying on the static parts, namely the ring sectors, to form a thermal barrier-type protective coating. However, the coatings thus obtained may not exhibit high abradability, which can lead to wear of the blade tips during operation, resulting in complex and costly repairs.

In order to increase the abradable nature of thermal barriers, various solutions have been considered in the state of the art. In this respect, mention may be made of the incorporation of blowing agents in order to increase the porosity of the barrier. However, these solutions may not be fully satisfactory because they can lead to a significant degradation of the erosion resistance of the coating and therefore the service life of the barrier and the underlying substrate.

There thus exists a need to provide a process for manufacturing an abradable layer having both good abradability and good erosion resistance.

SUMMARY

The invention is aimed at a process for manufacturing an abradable layer, comprising the following steps:
  compressing a powder composition comprising at least micrometric ceramic particles having a number-average form factor greater than or equal to 3, the mass content of said micrometric ceramic particles in the powder composition being greater than or equal to 85%, and
  sintering the powder composition thus compressed to obtain the abradable layer.

Unless otherwise stated, the number-average form factor corresponds to the number-average value of the following ratio R calculated for each particle of a given set of particles, with R denoting the ratio [largest dimension of the particle]/[largest cross-sectional dimension of the particle].

The use of the powder composition defined above and a pressure-sintering technique advantageously makes it possible to obtain a layer with both good abradability and good erosion resistance. Moreover, the inventors noted that abradable layers formed by pressure sintering have better erosion resistance than layers formed by plasma spraying with the same porosity rate or, in certain cases, a higher porosity rate.

In an example embodiment, the powder composition further comprises nanometric ceramic particles having a number-average form factor comprised between 0.7 and 1.3, preferably between 1.0 and 1.3, the mass content of said nanometric ceramic particles in the powder composition being less than or equal to 15%.

The presence of nanometric ceramic particles in the indicated contents advantageously further improves the erosion resistance of the abradable layer obtained without affecting the abradability.

In particular, the mass content of said nanometric ceramic particles in the powder composition can be between 1% and 10%.

However, the presence of nanometric ceramic particles is not compulsory insofar as, according to a variant, the powder composition consists essentially of said micrometric ceramic particles.

In an example embodiment, the mass content of said micrometric ceramic particles in the powder composition is greater than or equal to 90%.

In an example embodiment, said micrometric ceramic particles comprise at least acicular particles having a number-average form factor comprised between 3 and 5. As a variant or in combination, said micrometric ceramic particles comprise at least fibrous particles having a number-average form factor strictly greater than 5.

In an example embodiment the volume porosity rate of the abradable layer is greater than or equal to 20%.

"Volume porosity rate" is understood to mean the ratio between the volume of interstitial spaces separating the grains of the material considered and the overall volume of said material.

Such a porosity rate is advantageous in order to further improve the abradability of the layer formed.

In an example embodiment a compression pressure comprised between 12.5 MPa and 100 MPa is applied to the powder composition during sintering.

Such values for the compression pressure help to optimize the porosity rate of the abradable layer, and to optimize the abradability/erosion resistance compromise.

In an example embodiment the sintering time is comprised between 1 minute and 10 minutes.

Such values for the sintering time help to optimize the porosity rate of the abradable layer and to optimize the abradability/erosion resistance compromise.

In an example embodiment the required temperature during sintering is between 900° C. and 1150° C.

Such values for the temperature imposed during sintering help to optimize the porosity rate of the abradable layer and to optimize the abradability/erosion resistance compromise.

In an example embodiment, the powder composition is sintered using the spark plasma sintering (SPS) technique.

The invention is also aimed at a process for manufacturing a substrate coated with an abradable layer, the substrate being a turbomachine part and the process comprising:
  the deposition of the powder composition on a surface of the substrate, and the formation of the abradable layer on the substrate from the powder composition thus deposited by using a process as described above.

This variant concerns the case in which the powder composition is deposited on the substrate first and then the abradable layer is formed directly on the substrate by pressure sintering of the deposited powder composition.

As a variant, the invention is also aimed at a process for manufacturing a substrate coated with an abradable layer, the substrate being a turbomachine part and the process comprising:

the formation of the abradable layer by using a process as described above, the deposition of the abradable layer thus formed on a surface of the substrate, and the bonding of the abradable layer thus deposited on the surface of the substrate.

This variant concerns the case where the abradable layer is formed first, then this abradable layer is deposited on the substrate and then bonded to the substrate.

In an example embodiment, one of the two following conditions is verified:

the substrate is metallic, and said micrometric ceramic particles, as well as said nanometric ceramic particles if present, comprise at least zirconia, for example yttria-stabilized zirconia (YSZ) or yttria-partially-stabilized zirconia (YPSZ) or a mixture of zirconia and alumina, or the substrate is made of a ceramic matrix composite (CMC) material, and said micrometric ceramic particles, as well as any nanometric ceramic particles if present, are made of rare-earth silicate.

Such combinations of substrate and abradable layer materials are advantageous because they minimize differential expansion during operation.

In an example embodiment the substrate is a turbine or compressor ring sector.

BRIEF DESCRIPTION OF THE DRAWINGS

Other features and advantages of the invention will emerge from the following description, given in a non-limiting manner, with reference to the appended drawings, wherein.

DETAILED DESCRIPTION

Figure 1:
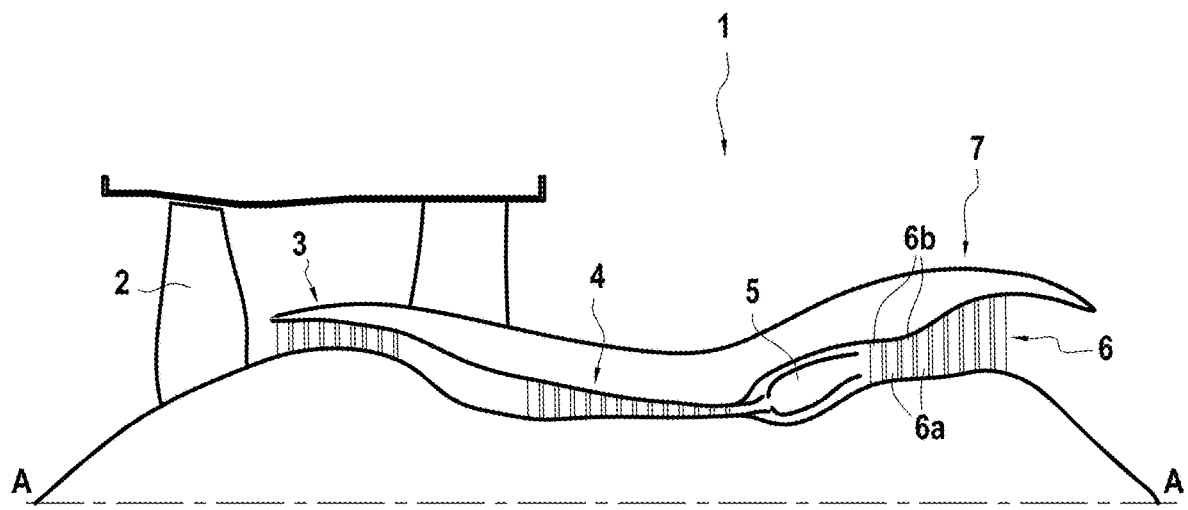
FIG. 1 is a sectional drawing of a turbomachine.

FIG. 1 represents, in a vertical cross-section along a vertical plane passing through its main axis A, a turbofan engine 1. It comprises, from upstream to downstream according to the flow of air, a fan 2, a low-pressure compressor 3, a high-pressure compressor 4, a combustion chamber 5, a high-pressure turbine 6, and a low-pressure turbine 7.

Figure 2:
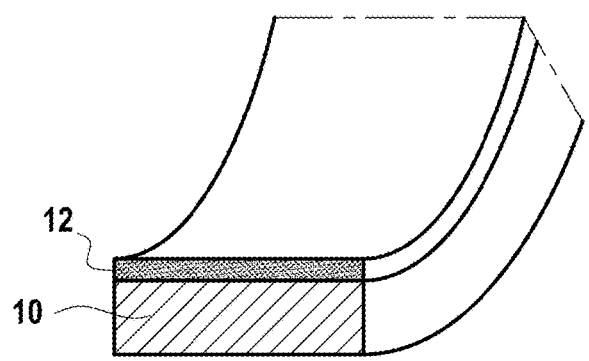
FIG. 2 is a partial perspective and schematic view of an example of a substrate coated by the process according to the invention, FIGS. 3A and 3B schematically illustrate several successive steps of an example of a process according to the invention.

The high-pressure turbine 6 comprises a plurality of blades 6a rotating with the rotor and rectifiers 6b mounted on the stator. The stator of the turbine 6 comprises a plurality of stator rings arranged opposite the moving blades 6a of the turbine 6. FIG. 2 illustrates a stator ring, which is divided into several sectors each comprising a substrate 10 coated with an abradable layer 12. The rotor blades 6a of the rotor rub against the abradable layer 12 in case of radial incursion of the rotor.

Figure 3A:
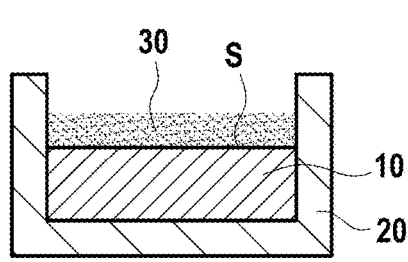
Figure 3B:
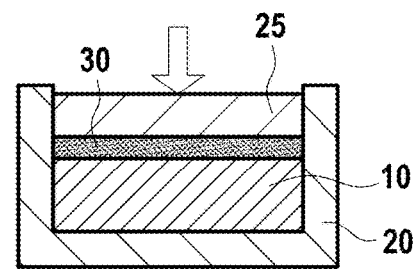

An example embodiment of the abradable layer 12 will be described in connection with FIGS. 3A and 3B. These FIGS. 3A and 3B schematically illustrate an example embodiment of the process according to the invention.

The substrate 10 to be coated is placed in the cavity of a mold 20. The powder composition 30 is then deposited on a surface S of the substrate 10. As shown in FIG. 3B, the mold 20 is then closed. A bearing surface of its lid 25 is applied against the layer of powder composition 30 so as to compress the latter on the substrate 10. The compression pressure applied to the powder composition 30 can be uniaxial. The thickness of the layer of powder composition 30 is thus reduced due to the compression between the substrate 10 and the lid 25. The powder composition 30 undergoing the compression pressure is then sintered. The abradable layer 12 is obtained at the end of this sintering step. The particles forming the powder composition 30 may be made of a thermal barrier material, such as yttriated zirconia, yttrium-partially-stabilized zirconia, a mixture comprising zirconia and alumina, or a rare-earth silicate, for example a rare-earth monosilicate or disilicate. A spark plasma sintering (SPS) technique can be used to produce the abradable layer 12.

In the example shown, the abradable layer 12 obtained has a substantially uniform density. As a variant, abradable layers of varying density could be formed as described in WO 2017/103420.

An example is described in connection with the figures in which the abradable layer 12 is formed directly on the substrate 10 from the powder composition 30 previously deposited on the substrate 10.

In a variant not shown, the abradable layer 12 can first be formed on a substrate separate from the substrate by using the pressure sintering process that was described above. According to this variant, the abradable layer 12 thus formed is then separated from the substrate to be positioned on the surface S of the substrate 10. The abradable layer 12 thus positioned is then bonded to the surface S of the substrate 10 in order to obtain the coated substrate. This bonding can be carried out by brazing, sintering or by means of attachments (for example bolting).

The abradable layer 12 formed is especially suited to equip high- or low-pressure turbine rings or compressor rings, for example in the aeronautical field, and most especially in aircraft turbojet engines.

Various details relative to the substrate 10, the powder composition 30 and the operating parameters that may be imposed during the process will now be described.

The substrate 10 can be a part for a turbomachine. The substrate 10 can be made of a metallic material, for example superalloy. When the substrate 10 is made of a metallic material, the latter can for example be formed from one of the following materials: alloy AM1, alloy C263 or alloy M509.

As a variant, the substrate 10 can be made of CMC material. In this case, the substrate 10 can have a woven fibrous reinforcement, formed from carbon or silicon carbide fibers, densified by a ceramic matrix, for example comprising silicon carbide. A detailed example of the fabrication of CMC ring sectors is described in particular in US 2012/0027572.

The substrate 10 can be coated with a bond coat (not shown) which the abradable layer 12 is intended to coat. In the case of a metallic substrate 10, an MCrAlY bond coat, for example a CoNiCrAlY bond coat, can be used. In the case of a CMC substrate, a mullite bond coat can be used, for example.

Concerning the powder composition 30, it has been indicated above that the mass content of micrometric ceramic particles having a number-average form factor greater than or equal to 3 in this composition is greater than or equal to 85%. This mass content may be greater than or equal to 90%, preferably greater than or equal to 95%.

As indicated above, the micrometric ceramic particles may comprise acicular particles having a number-average form factor comprised between 3 and 5, fibrous particles having a number-average form factor greater than 5, or a mixture of such particles. The number-average form factor of the fibrous particles may, in particular, be comprised between 15 and 25.

According to a particular variant, the entirety of the micrometric ceramic particles can be constituted by the fibrous particles. According to another particular variant, the entirety of the micrometric ceramic particles can be constituted by the acicular particles. According to still another particular variant, the entirety of the micrometric ceramic particles can be constituted by a mixture of acicular and fibrous particles.

The acicular particles may have an average diameter in the non-agglomerated state (or average width) greater than or equal to 15 µm, for example comprised between 15 µm and 35 µm. The acicular particles may have an average length greater than or equal to 55 µm, for example comprised between 55 µm and 75 µm.

The average diameter and average length can be measured using a field-effect scanning electron microscope (SEM-FEG). The average diameter and average length are number averages.

The acicular particles usable in the context of the invention can be obtained by sol-gel process under the conditions described in the following article: C. Viazzi & al., 2006, Solid State Sciences 8 1023-1028, "*Synthesis of Yttria Stabilized Zirconia by sol-gel route: Influence of experimental parameters and large scale production*".

By way of example, a succession of possible steps to synthesize acicular yttriated zirconia particles usable in the context of the invention is provided below:

mix acetyl-acetone in 1-propanol and zirconium propoxide ($Zr(OC_3H_7)_4$), then mix under stirring in 1-propanol, mix the composition thus obtained with a 0.5 mol/L solution of yttrium nitrate in 1-propanol, then mix under stirring in 1-propanol, mix the composition thus obtained with 10 mol/L water in 1-propanol for 15 minutes at 20° C. in order to obtain first a sol and then a gel, dry the gel conventionally at 70° C. for 24 hours in order to obtain a xerogel, heat treat the xerogel obtained at 1000° C. for 2 hours in order to obtain the acicular yttriated zirconia particles.

The fibrous particles may have an average diameter in the non-agglomerated state (or average width) greater than or equal to 6 µm, for example comprised between 6 µm and 8 µm. The fibrous particles may have an average length greater than or equal to 125 µm, for example comprised between 125 µm and 215 µm.

By way of example of fibrous particles usable in the context of the invention, mention may be made of the particles marketed under the name ZYBF-5 (CF010) by the firm Zircar.

As indicated above, the powder composition may comprise nanometric ceramic particles having a number-average form factor comprised between 0.7 and 1.3, preferably between 1.0 and 1.3, and present in a limited amount so as not to degrade the abradability of the layer obtained.

The mass content of the nanometric ceramic particles in the powder composition is preferably less than or equal to 10%, preferably less than or equal to 5%.

The mass content of the nanometric ceramic particles in the powder composition can, for example, be comprised between 1% and 15%, for example between 5% and 15%, for example between 5% and 10% or between 10% and 15%. The mass content of the nanometric ceramic particles in the powder composition can, for example, be comprised between 1% and 10%, for example between 1% and 5%.

The nanometric ceramic particles can have an average diameter in the non-agglomerated state of less than or equal to 70 nm, for example comprised between 30 nm and 70 nm.

The nanometric ceramic particles can have a number-average form factor comprised between 0.9 and 1.1, preferably between 1.0 and 1.1, for example substantially equal to 1. The nanometric ceramic particles can thus have a substantially spherical shape.

By way of example of usable nanometric ceramic particles, mention may be made of the particles marketed under the name Zirconia TZ 6Y by the firm Tosoh.

The powder composition 30 can consist essentially of micrometric ceramic particles, and any nanometric ceramic particles that may be present.

Figures 4A, 4B, 4C:
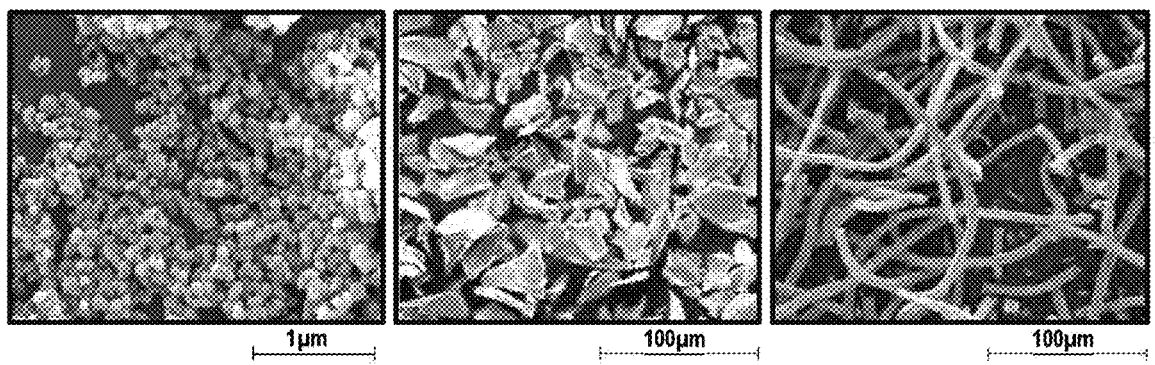
FIGS. 4A to 4C are scanning electron microscope photographs of particles that can be used in the powder composition in the context of the invention.

By way of illustration, photographs of particles usable in the invention are provided in FIGS. 4A to 4C. FIG. 4A is a photograph of nanometric ceramic particles having a substantially spherical shape and a form factor substantially equal to 1. FIG. 4B is a photograph of acicular micrometric ceramic particles having a number-average form factor comprised between 3 and 5. FIG. 4C is a photograph of fibrous micrometric ceramic particles having a number-average form factor strictly greater than 5.

Various details concerning the substrate 10 and the powder composition 30 have just been described. Details concerning the abradable layer 12 that can be obtained and the operating conditions under which it can be applied are now described.

The volume porosity rate of the abradable layer can be greater than or equal to 20%, for example 30%, for example greater than or equal to 35%. This volume porosity rate can be comprised between 20% and 50%, for example between 30% and 50%, for example between 35% and 50%.

The temperature imposed during sintering, the sintering time and/or the applied compression pressure can be modified in order to vary the volume porosity of the abradable layer 12 obtained. The temperature, the sintering time and/or the compression pressure can be increased in order to decrease the volume porosity of the abradable layer 12.

Figure 5A:
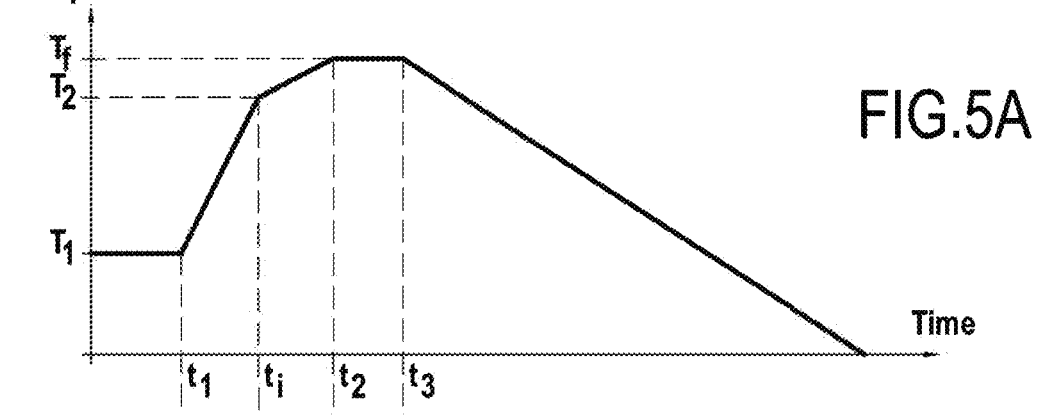
FIGS. 5A and 5B illustrate an example of the change in temperature and compression pressure that can be implemented in a process according to the invention.
Figure 5B:
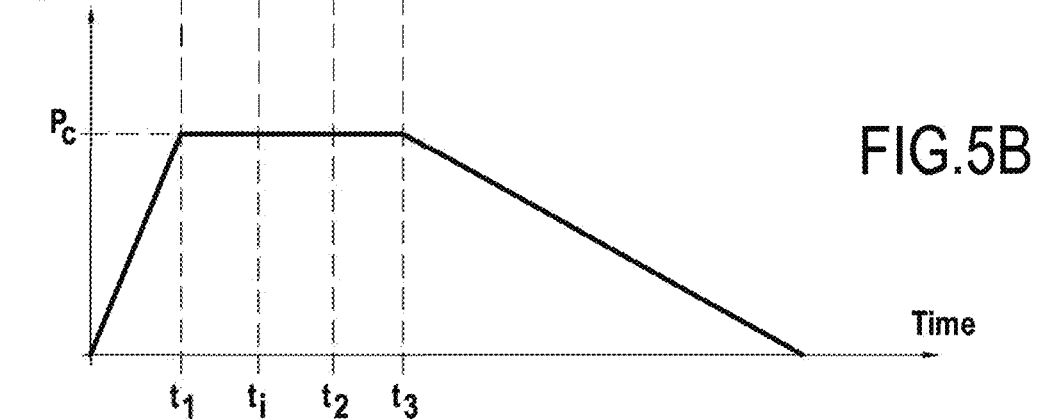

A possible example of the change in compression pressure and temperature during the manufacture of the abradable layer 12 is shown in FIGS. 5A and 5B.

The assembly of the substrate 10 and the powder composition 30 is initially brought to a first temperature $T_1$, for example greater than or equal to 600° C. While the assembly is brought to this first temperature $T_1$, the compression pressure increases until it reaches, at a first time $t_1$, a plateau at a value Pc which corresponds to the compression pressure that will be applied during the sintering of the powder composition 30.

The compression pressure Pc imposed on the powder composition 30 during sintering may be less than or equal to 100 MPa, for example less than or equal to 50 MPa. This compression pressure Pc can be comprised between 12.5 MPa and 100 MPa, for example between 25 MPa and 100 MPa, for example between 25 MPa and 50 MPa or between 50 MPa and 100 MPa. The compression pressure Pc is maintained throughout the sintering of the powder composition 30.

From the first time $t_1$, the temperature imposed on the substrate 10 and on the powder composition 30 is increased to the sintering temperature $T_f$. The temperature reaches the sintering temperature $T_f$ at a second time $t_2$ and is then maintained at this value. The sintering temperature $T_f$ depends on the nature of the powder composition 30 used. The sintering temperature $T_f$ can be comprised between 900° C. and 1150° C., for example between 1050° C. and 1150° C.

The sintering temperature $T_f$ and the compression pressure Pc are maintained until the third time $t_3$. The sintering time ($t_3-t_2$) can be greater than or equal to 1 minute, for example comprised between 1 minute and 10 minutes, for example between 1 minute and 6 minutes. Once sintering is finished, the compression pressure and the temperature are gradually reduced and the substrate 10 coated with the abradable layer 12 is then recovered.

In the example shown, a first rate of temperature increase between the first temperature $T_1$ and a second, higher temperature $T_2$ reached at the intermediate time $t_i$ is imposed, followed by a second rate of temperature increase, lower than the first rate of temperature increase, between the second temperature $T_2$ and the sintering temperature $T_f$. By way of illustration, the first rate of temperature increase may be greater than or equal to 100° C./minute and the second rate of temperature increase may be less than or equal to 50° C./minute. Still by way of illustration, the second temperature $T_2$ can be greater than or equal to 1000° C. However, it is not beyond the scope of the invention when the rate of temperature rise is constant between the first temperature $T_1$ and the sintering temperature $T_f$.

EXAMPLES

Example 1 (Invention)

A powder composition consisting of 100% by mass of micrometric yttriated zirconia fibers marketed under the name ZYBF-5 (CF010) by the firm Zircar was shaped by spark plasma sintering under the following conditions:
  sintering temperature: 1100° C.,
  dwell time at sintering temperature: 6 minutes,
  compression pressure applied during sintering: 50 MPa.
  The layer obtained had a volume porosity rate of about 50%.

Abradability tests were carried out under the following experimental conditions:
  3 blades are fixed on the test disc,
  blade rotation speed: 210 m/s,
  rate of incursion into the abradable layer: 50 µm/s,
  penetration distance: 500 µm.

Figure 6:
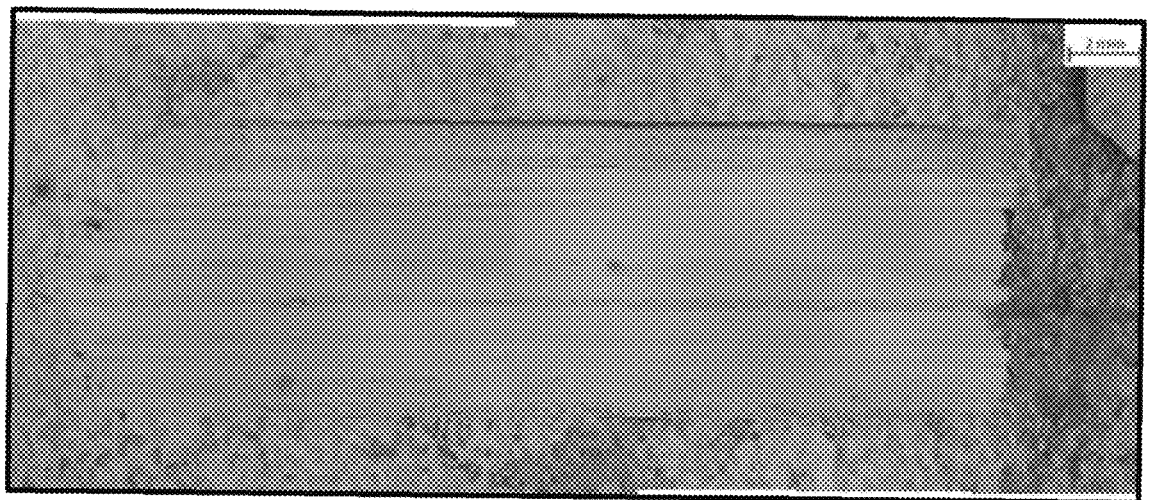
FIG. 6 is a photograph illustrating the result obtained in the context of an abradability test for a layer formed in the context of the invention.
Figure 7:
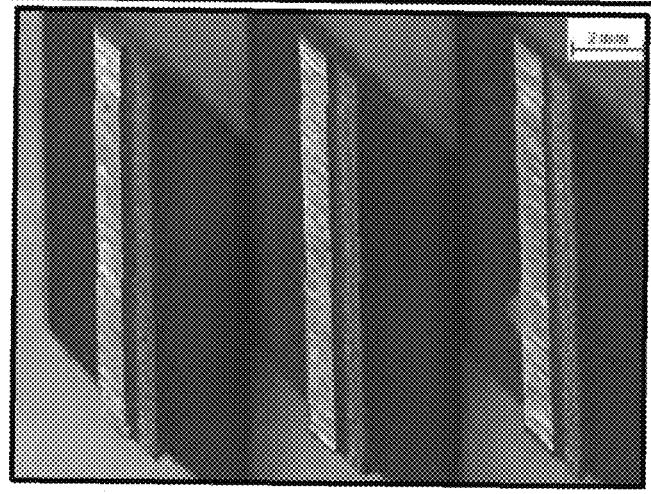
FIG. 7 is a photograph illustrating the condition of the blade tips obtained following the abradability test of FIG. 6.

The trace obtained in the layer and the condition of the blade tips are visible respectively on FIGS. 6 and 7.

The area where the contact took place has very low metal transfers and therefore a very satisfactory abradable behavior due to the fact that the blade tips are little worn. Pre- and post-test measurements of blade thickness (measurement in the center of the blade) and mass made it possible to account for blade wear. The appearance of striations was observed at the top of the blades, which indicates low wear. This was confirmed by the results of the thickness and mass variation measurements which are reported in the table below.

| Blade 1 | | Blade 2 | | Blade 3 | |
|---|---|---|---|---|---|
| % thickness | % mass | % thickness | % mass | % thickness | % mass |
| 0.1 | 0.0 | 0.2 | 0.1 | 0.6 | 0.2 |

Example 2 (Outside the Invention)

By way of comparison, a powder composition comprising the following mixture was sintered by spark plasma sintering:
  80% by mass of micrometric yttriated zirconia fibers marketed under the name ZYBF-5 (CF010) by the firm Zircar, and
  20% by mass of nanometric ceramic particles marketed under the name Zirconia TZ 6Y by the firm Tosoh.

The conditions imposed during spark plasma sintering were as follows:
  sintering temperature: 1110° C.,
  dwell time at sintering temperature: 6 minutes,
  compression pressure applied during sintering: 50 MPa.

Figure 8:
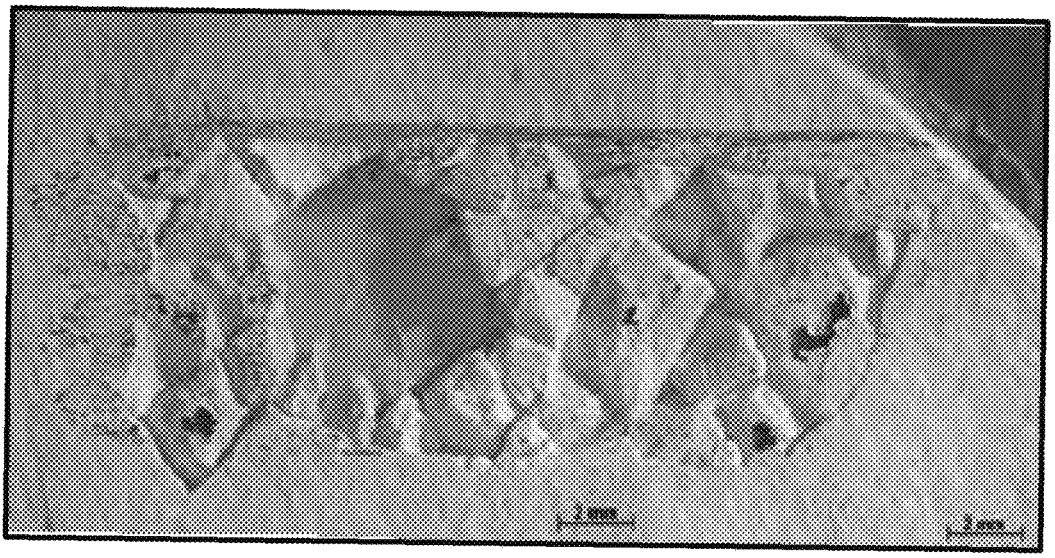
FIG. 8 is a photograph illustrating the result obtained in the context of an abradability test for a layer formed in the context of a process outside the invention.
Figure 9:
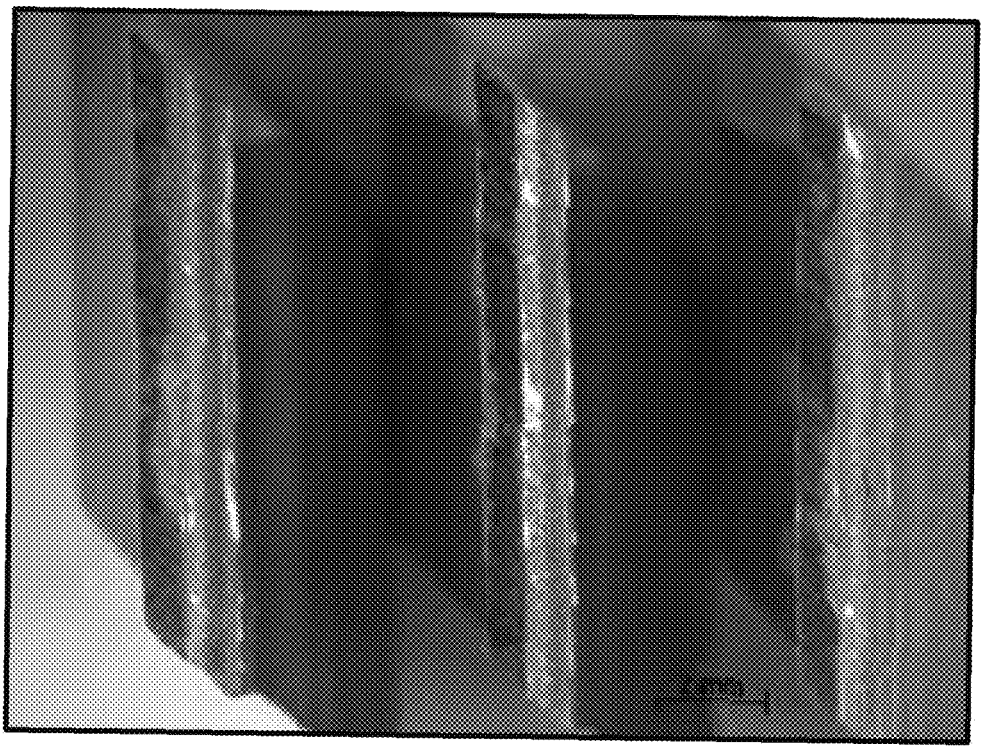
FIG. 9 is a photograph illustrating the condition of the blade tips obtained following the abradability test of FIG. 8.

It was noted that such a material has a much less abradable behavior and wear of the blade tips (see FIGS. 8 and 9 respectively). This behavior is explained by the excessive content of nanometric ceramic particles (20% by mass) which negatively affects the abradability.

The expression "comprised between . . . and . . . " should be understood to include the bounds.

The invention claimed is:
1. A process for manufacturing a substrate coated with an abradable layer, the substrate being a turbomachine part and the process comprising:
  forming the abradable layer on a surface of the substrate comprising a powder composition comprising at least micrometric ceramic particles having a number-average form factor greater than or equal to 3, a mass content of said micrometric ceramic particles in the powder composition being greater than or equal to 85%, the form factor of a particle being defined as the ratio [largest dimension of the particle]/[largest cross-sectional dimension of the particle], by heating said micrometric ceramic particles, as well as any nanometric ceramic particles that may be present to a first temperature $T_1$ greater than or equal to 600° C. and while the assembly is brought to this first temperature $T_1$, increasing a compression pressure until it reaches, at a first time $t_1$, a plateau at a value Pc which corresponds to the compression pressure that will be applied during the sintering of the powder composition; then increasing the temperature of the powder composition and the substrate to the sintering temperature $T_f$ reached at a second time $t_2$; then maintaining the sintering temperature $T_f$ and the compression pressure $P_c$ until the third time $t_3$ to obtain the abradable layer, wherein a temperature imposed during sintering, the sintering time and the compression pressure applied are selected so as to obtain a volume porosity rate of the abradable layer greater than or equal to 20%.

2. The process as claimed in claim 1, wherein the powder composition further comprises nanometric ceramic particles having a number-average form factor comprised between 0.7 and 1.3, the mass content of said nanometric ceramic particles in the powder composition being less than or equal to 15%.

3. The process as claimed in claim 2, wherein the mass content of said nanometric ceramic particles in the powder composition is comprised between 1% and 10%.

4. The process as claimed in claim 1, wherein the powder composition consists essentially of said micrometric ceramic particles.

5. The process as claimed in claim 1, wherein the mass content of said micrometric ceramic particles in the powder composition is greater than or equal to 90%.

6. The process as claimed in claim 1, wherein said micrometric ceramic particles comprise at least acicular particles having a number-average form factor comprised between 3 and 5.

7. The process as claimed in claim 1, wherein said micrometric ceramic particles comprise at least fibrous particles having a number-average form factor strictly greater than 5.

8. The process as claimed in claim 1, wherein a compression pressure comprised between 12.5 MPa and 100 MPa is applied to the powder composition during sintering.

9. The process as claimed in claim 1, wherein the sintering time is comprised between 1 minute and 10 minutes.

10. The process as claimed in claim 1, wherein the temperature imposed during sintering is comprised between 900° C. and 1150° C.

11. The process as claimed in claim 1, wherein the powder composition is sintered by a spark plasma sintering technique.

12. The process as claimed in claim 1, wherein one of the following two conditions is verified:
the substrate is metallic, and said micrometric ceramic particles, as well as any nanometric ceramic particles that may be present, comprise at least zirconia, or
the substrate is made of a ceramic matrix composite material, and said micrometric ceramic particles, as well as any nanometric ceramic particles that may be present, are made of rare-earth silicate.

13. The process as claimed in claim 1, wherein the substrate is a turbine or compressor ring sector.

* * * * *